US010231569B2

(12) United States Patent
Perentes et al.

(10) Patent No.: US 10,231,569 B2
(45) Date of Patent: Mar. 19, 2019

(54) CAPSULE SYSTEM WITH FLOW ADJUSTMENT MEANS

(75) Inventors: Alexandre Perentes, Lausanne (CH); Christian Jarisch, Lutry (CH); Alfred Yoakim, St-legier-la Chiesaz (CH)

(73) Assignee: Nestec S.A., Vevey (CH)

( * ) Notice: Subject to any disclaimer, the term of this patent is extended or adjusted under 35 U.S.C. 154(b) by 1324 days.

(21) Appl. No.: 13/514,517

(22) PCT Filed: Nov. 25, 2010

(86) PCT No.: PCT/EP2010/068172
§ 371 (c)(1),
(2), (4) Date: Jun. 7, 2012

(87) PCT Pub. No.: WO2011/069829
PCT Pub. Date: Jun. 16, 2011

(65) Prior Publication Data
US 2012/0240779 A1  Sep. 27, 2012

(30) Foreign Application Priority Data

Dec. 8, 2009  (EP) .................................... 09178382

(51) Int. Cl.
*A47J 31/40*  (2006.01)
*A47J 31/22*  (2006.01)
*B65D 85/804*  (2006.01)

(52) U.S. Cl.
CPC .......... *A47J 31/22* (2013.01); *B65D 85/8043* (2013.01)

(58) Field of Classification Search
CPC .. A47J 31/22; A47J 31/40; A47J 31/41; A47J 31/46; B65D 85/8043

(Continued)

(56) References Cited

U.S. PATENT DOCUMENTS

2006/0110507 A1*  5/2006  Yoakim .............. B65D 85/8043
                                                        426/433
2010/0028495 A1*  2/2010  Novak ................ A47J 31/0668
                                                        426/77

FOREIGN PATENT DOCUMENTS

EP          0651963 A1    5/1995
FR          2487661 A1    2/1982
(Continued)

OTHER PUBLICATIONS

International Search Report and Written Opinion dated Apr. 24, 2011 for PCT/EP2010/068172.

*Primary Examiner* — Michael G Hoang
(74) *Attorney, Agent, or Firm* — K&L Gates LLP

(57) ABSTRACT

The present invention relates to a capsule system for preparing beverages by centrifugation of a capsule (1) in a centrifuging brewing device comprising: —a centrifuging brewing device comprising control means (25) capable of operating the device in centrifugation by controlling the beverage flow rate and/or the volume of the beverage, and —a capsule to be inserted in the brewing device wherein the capsule is designed to form, alone or in cooperation with the centrifuging brewing device, a flow restriction or flow restriction valve which provides a backpressure for the centrifuged liquid, wherein the control means (25) of the device selectively adjusts the rotational centrifugation speeds of the inserted capsule (1) and/or the volume of injected liquid in the capsule as a function of the exerted backpressure by the restriction or restriction valve.

11 Claims, 4 Drawing Sheets

(58) Field of Classification Search
USPC .......... 99/283, 295, 299, 300, 302 R, 302 C
See application file for complete search history.

(56) References Cited

FOREIGN PATENT DOCUMENTS

| | | |
|---|---|---|
| GB | 2125688 | 3/1984 |
| JP | 5037575 | 4/1975 |
| JP | 5914827 | 1/1984 |
| JP | 5982817 | 5/1984 |
| JP | 6337142 | 3/1988 |
| WO | 2006/112691 A1 | 10/2006 |
| WO | 2008/148646 A1 | 12/2008 |
| WO | 2009/106598 A1 | 9/2009 |
| WO | 2008/148604 A1 | 6/2012 |

\* cited by examiner

CAPSULE SYSTEM WITH FLOW ADJUSTMENT MEANS

CROSS REFERENCE TO RELATED APPLICATIONS

The present application is a National Stage of International Application No. PCT/EP2010/068172, filed on Nov. 25, 2010, which claims priority to European Patent Application No. 09178382.9, filed on Dec. 8, 2009, the entire contents of which are being incorporated herein by reference.

FIELD OF THE INVENTION

The present invention relates to a system for preparing a beverage from a beverage substance contained in the capsule by passing a liquid through the substance using centrifugal forces.

In particular, the present invention relates to a system and a device with flow adjustment means enabling to adjust the flow rate and/or the back-pressure during a beverage production with the device.

BACKGROUND OF THE INVENTION

It exist systems for preparing beverages such as coffee by forcing a liquid through ingredients contained in the capsule using centrifugal forces.

WO 2008/148604 for example relates to a capsule for preparing a beverage or liquid food from a substance, in a centrifugal brewing unit, by passing water through the substance contained in the capsule by using brewing centrifugal forces comprising: an enclosure containing a predetermined dose of substance; opening means which opens under the centrifugal effect to allow the brewed liquid to leave the capsule. The capsule may also comprise means for engaging the capsule to external rotational driving means of a centrifugal brewing device wherein the engaging means are configured to offer a resistance to torque during rotation of the capsule for maintaining the capsule in a reference rotational position.

Thereby, the effect of centrifugal forces to brew coffee or prepare other food substances presents many advantages compared to the normal brewing methods using pressure pumps. For example, in traditional espresso or lungo coffee type brewing methods using a pressure pump, it is very difficult to master all the parameters which influence the quality of extraction of delivered coffee extract. These parameters are typically the pressure, the flow rate which decreases with the pressure, the compaction of the coffee powder which also influences the flow characteristics and which depends on the coffee ground particle size, the temperature, the water flow distribution and so on. In particular, it is not easy to vary the extraction pressure and flow rates because there are essentially determined by the static pressure deliverable by the pump, the resistance of the bed of coffee and the downstream filtering system.

For a centrifugal extraction, the rotating capsule is used as a centrifugal pump. The rotational speed thus determines the flow rate of the centrifuged liquid coming out of the capsule. The quality of the beverage to be prepared depends on the control, in particular, of the flow rate. In particular, the flow rate is influenced by two parameters: the rotational speed of the capsule in the device and the back-pressure exerted on the centrifuged liquid before it is projected out of the capsule. For a given back-pressure, the higher the rotational speed, the larger the flow rate. Conversely, for a given rotational speed, the larger the back-pressure, the smaller the flow.

Whereas the rotational speed of the capsule is usually controlled by control means selectively activating a rotational motor of a centrifugal beverage production device, a predefined back-pressure is preferably obtained by a flow restriction of the centrifuged liquid at the outlet of the capsule or at the outside of a centrifugal cell carrying the capsule.

For example EP 651 963 teaches that a pressure gradient is obtained by a rubber-elastic element interposed at the interface between the lid and the cup of the centrifugal cell. Such an element deforms elastically to leave a filtering passage for the liquid when a certain pressure is attained at the interface. The coffee grains are retained in the cell while centrifuged liquid is allowed to pass the filtering passage. Furthermore, document FR 2 487 661 and WO 2006/112691 relate to centrifugal systems wherein a fixed restriction is placed downstream of the filter to create a pressure gradient.

Moreover, WO 2008/148646 proposes a solution in which a flow restriction is placed in or outside the centrifugal cell. The flow restriction can comprise a regulating spring biased valve offering an effective back-pressure. The spring biased valve opens under the effect of a sufficient pressure of liquid exerting on the valve. The higher the speed, the larger the passage through the valve, and the higher the flow rate. The valve can be preloaded by a resilient element such as rubber or spring elements.

Therefore is a need for being able to provide beverages, (e.g. coffee) having different characteristics of intensity, taste, aroma, foam/crema in a system that is simple and versatile.

For prior art system without back-pressure regulation, the problem is that the flow can be increased only by increasing the centrifugation speed. Therefore, this creates limits to vary the flow rate of the beverage, thereby also limiting the possibility to deliver beverages of different characteristics. Furthermore, too high rotational speeds may create problems such as noise, vibration and premature wearing of the mechanical pieces of the device.

Therefore, there is a need for proposing a new system for which the brewing parameters and in particular the back-pressure and/or the flow rate during the beverage preparation be better and more independently controlled for improving quality of the delivered food liquid.

The present invention provides a solution to the before-mentioned problems as well as offers additional benefits to the existing art.

OBJECT AND SUMMARY OF THE INVENTION

A first aspect of the invention relates to a capsule system for preparing beverages by centrifugation of a capsule in a centrifuging brewing device comprising:
 a centrifuging brewing device comprising control means capable of operating the device in centrifugation by controlling the beverage flow rate and/or the volume of the beverage, and
 a capsule to be inserted in the brewing device,
wherein the capsule is designed to form, alone or in cooperation with the centrifuging brewing device, a flow restriction or flow restriction valve which provides a backpressure for the centrifuged liquid,
wherein the control means of the device selectively adjusts the rotational centrifugation speeds of the inserted capsule and/or the volume of injected liquid in the capsule as a function of the exerted backpressure by the restriction or restriction valve.

The term "back-pressure of the valve means" refers to the pressure loss created by the restriction or restriction valve. As the restriction or restriction valve form a "bottleneck effect", a pressure of liquid is created upstream of it by the effect of the centrifugation. Thanks to the restriction, the pressure before the restriction is increased, and it is this pressure which has an effect on the interaction (e.g. extraction) process of the liquid and the ingredients). This pressure of the restriction valve can also be defined as the ratio of force ("back-force") in particular which the spring loaded surface of the beverage production device exerts on the capsule, divided by the area of contact surface at the restriction valve.

In a preferred mode, the capsule comprises a rim portion which is designed to interact with an enclosing member of the brewing device to form a flow restriction valve which exerts a back-pressure onto the rim of the capsule.

The centrifugal forces created by rotating the liquid hitting the restriction valve produce a pressurization of the liquid upfront the valve. Once this pressure reaches a threshold value, the valve will start to open, i.e. the rim of the capsule will be slightly distanced from the cooperating surface of the beverage production device.

The adjustment of the rotational centrifugation speed may be a selection amongst at least two, preferably at least three, different values or ranges of rotational speed of the capsule enabling release of centrifuged liquid from the capsule through the valve means.

The rotational speed may be adjusted during release of the centrifuged liquid to match a reference flow rate of the injected liquid in the capsule.

In a possible mode, the rotational speed may be adjusted during release of the centrifuged liquid to match a reference pressure of the injected liquid in the capsule. The pressure of the injected liquid can be measured in any convenient location in the fluid line between the pump and the capsule.

The predefined values of the rotational speed of the capsule may additionally be altered by a user operation within a given range.

The predefined values of the rotational speed of the capsule may be, preferably automatically, adjusted by means of a physical feature of the capsule.

In particular, the geometry of the rim of the capsule may be designed to vary the value of the exerted backpressure of the flow restriction valve.

More particularly, the thickness of the rim may differ for at least for two different capsules, preferably at least three different capsules, thereby calibrating at least two different back-pressures of the valve means. In particular, calibrating is carried out by engagement of the rim of the capsule with a spring-biased valve portion of the beverage device.

The thickness of the rim may be increased or decreased as a function of the storage volume and/or the weight of the beverage substance enclosed in the capsule and/or the type of beverage to be prepared.

The value of the thickness of the rim of the capsule may vary between 0.2 and 5 mm depending of the type of capsule.

Moreover, the rim of the capsule may be formed integral with the body of the capsule in a direction essentially perpendicular to an axis of rotation of the capsule.

A further aspect of the invention relates to a centrifuging brewing device for preparing beverages by centrifugation of a capsule, comprising a rotary capsule holder of the brewing device for holding a capsule, rotary drive means to drive the capsule in rotational centrifugation, injection means for injecting liquid in the capsule, wherein the injection means are connected to a pump, the device further comprising control means connected to at least the rotary drive means and the pump which are designed to vary the flow rate of the beverage and/or the volume of the beverage, wherein the device further comprises backpressure related sensing means connected to the control means and designed for sensing directly or indirectly the backpressure of a flow restriction or a flow restriction valve provided in the capsule or provided by cooperation of the capsule with the centrifuging brewing device.

The control means may be configured to adjust the rotational speed of the drive means dependent on the sensed backpressure.

The control means may be designed to vary the injected volume of liquid into the capsule dependent on the sensed back-pressure.

The control means can adjust the starting rotation speed for the extraction. The rotation speed can be varied during extraction, in particular, to ensure a control of a flow rate of reference during extraction.

The flow restriction valve may comprise an engaging portion and a spring biasing means forcing the engaging portion onto the rim portion of the capsule.

In a first possible mode the back-pressure sensing means may comprise at least one pressure sensor configured for measuring the backpressure exerted by the engaging portion onto the rim of the capsule.

In a second possible mode, the back-pressure detection means may comprise at least one distance sensor for detecting a variation of the compression distance in the valve means reflecting indirectly the backpressure.

The centrifuging brewing device may furthermore comprise a flow metering means for sensing the flow rate of the liquid supplied to the capsule and adjusting the flow by varying the rotational speed to match a flow rate of reference.

The capsules according to the system of the present invention may further comprise additional capsule identifying means associated to the different capsules in the set for adjusting at least one brewing parameter chosen amongst the list consisting of: liquid temperature, pump flow rate, rotational speed, liquid volume, water pressure, prewetting time and combinations thereof. Such additional capsule identifying means can be a barcode, RFID, colour recognition, ferro-magnetic element, mechanical prongs and combinations thereof.

The device of the invention thereby comprises a reader suitable for reading the additional identifying means of the capsule. The reader is connected to the control unit of the device for controlling the different means of the device in response to the detected capsule. The reader is adapted to read a code chosen amongst the list of: a barcode, RFID, colour recognition, ferro-magnetic element, mechanical prongs and combinations thereof.

Preferably, the back-pressure (i.e. the pressure above the atmospheric pressure) exerted by the restriction or valve means can range between 5 $N/cm^2$ (0.5 bar) and 180 $N/cm^2$ (18 bar), more preferably between 15 $N/cm^2$ (1.5 bar) and 134 $N/cm^2$ (13.4 bar), most preferably between 27 $N/cm^2$ (2.7 bar) and 87 $N/cm^2$ (8.7 bar) depending on the type of capsule.

The restriction created by the valve in the open configuration or by orifice(s) is preferably controlled by design of the capsule and/or device to be comprised between 0.5 and 4.0 mm$^2$, more preferably between 0.75 and 3.0 mm2, most preferably between 1.0 and 2.5 mm$^2$, for example, at about 1.7 mm$^2$.

The rotational speed is preferably controlled between a range of from 2000 and 16500 rpm, most preferably between 4000 and 10000 rpm. For at least two capsules of the set, preferably for at least three capsules of the set, at least one rotational speed is different during centrifugation of the liquid in the capsule, within the controlled range.

The flow rate is preferably controlled to range between 0.1 and 10 ml/seconds, more preferably between 0.5 and 3.5 ml/seconds. Again for at least two capsules of the set, preferably for at least three capsules of the set, at least one flow rate is different during centrifugation of the liquid in the capsule.

In another mode of the invention, the set of capsules comprises the flow restriction valve as a whole. In other words, the valve is not obtained by the conjunction of a valve portion of the capsule and a valve portion of the capsule but it is obtained by portions of the capsule itself. An example of a capsule having such kind of restriction valve is described in WO2008/148604 which content is here included by reference. In the cited publication, the restriction valve is referred as an opening means which opens under the centrifugal effect to allow the brewed liquid to leave the capsule. The opening or valve means can comprise a resilient valve. For instance, the opening means comprises at least one radial deflecting lip integral to a wall of the capsule. For instance, a lid of the capsule is connected to a body and the deflectable lip is part of the lid. The lip has precise dimensions to provide a predetermined opening pressure. In the context of the present invention, the opening or restriction valve is configured to provide a closing pressure of the valve for the centrifuged liquid which varies for at least two capsules, preferably at least three capsules of the set and/or is configured to open to form a restriction area in the open configuration of the valve that differs for at least two capsules, preferably at least three capsules of the set. As a result the pressure loss created by the valve means differs for at least two capsules, and preferably at least three capsules, of the set.

It should also be noticed that the portions in contact of the valve can be on the capsule itself but the spring-biasing means be on the device for urging the portions of the capsule in closure together. The valve would still be part of the capsule but the closure force of the valve setting the back-pressure be assured by the device.

In another mode, the capsules have flow restriction orifices (i.e., replacing the flow restriction valve as aforementioned) which overall surface area increases in the set of capsules as a function of the increase of the amount of powder and/or size of capsule in the set. Therefore, the larger the capsule, the larger the flow area for the centrifuged liquid in the capsule and consequently the lower the backpressure exerted by the restriction orifices. Furthermore, the rotational speed is also set in the device to increase when the amount of coffee powder decreases in the capsules and/or the size of the capsules decreases. The sensing means may be adapted to sense the backpressure upstream of said restriction.

In a preferred embodiment, the capsules according to the system of the invention contain coffee powder of different sorts to produce coffee beverages having characteristics (strength, aroma, taste, crema, . . . ) and different volumes, e.g., 25, 40, 110, 250, 400 mL (e.g., ristretto, espresso, lungo, doppio, Americano, Long black etc) with preferably variable crema characteristics (volume and/or texture).

By "different sorts" of a beverage substance or coffee it is meant any difference regarding: weight in the capsule, grind size, tap density, roasting levels, origins, blends, nature of ingredients (coffee, tea, cocoa, additives, etc.) and combinations thereof.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1A:
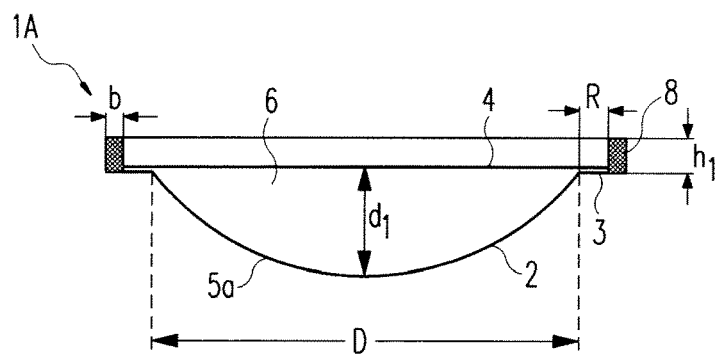
FIG. 1a-1c are cross sectional side views of different embodiments of a capsule having different sizes according to the invention and a variation of height of their rim.
Figure 1B:
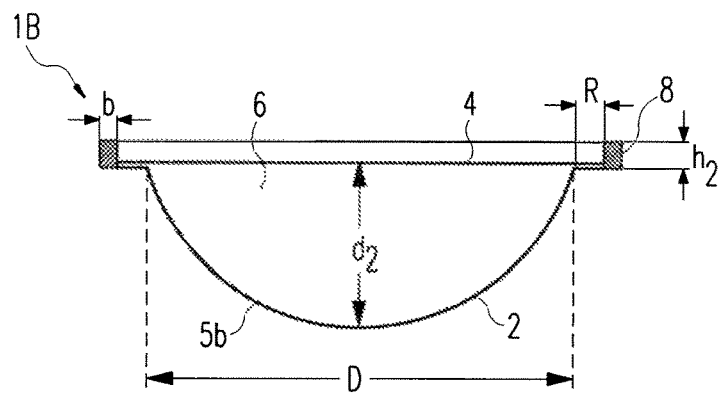
Figure 1C:
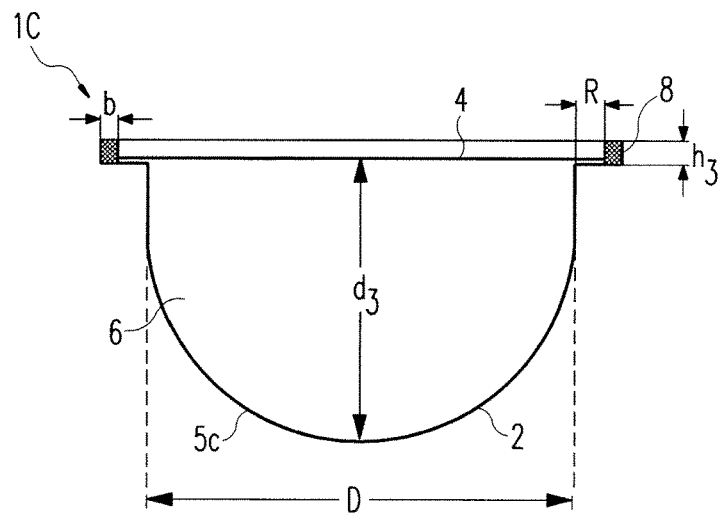

FIGS. 1a, 1b and 1c relate to a preferred embodiment of a set of capsules 1A, 1B, 1C according to the invention. The capsules preferably comprise a body 2, a rim 3 and an upper wall member respectively a perforable membrane 4. Thereby the membrane 4 and the body 2 enclose an enclosure respectively ingredients compartment 6. As shown in the figures, the membrane 4 is preferably connected onto an inner annular portion R of the rim 3 that is preferably between 1 to 5 mm. The membrane 4 is connected to the rim 3 of the body by a seal such as a heat or ultrasonic weld line.

The rim is not necessarily horizontal as illustrated. It can be slightly bended in order to increase the resistance of the seal to the increasing pressure pushing on the membrane with time, due to degassing of the capsule ingredient with time.

Figure 3:
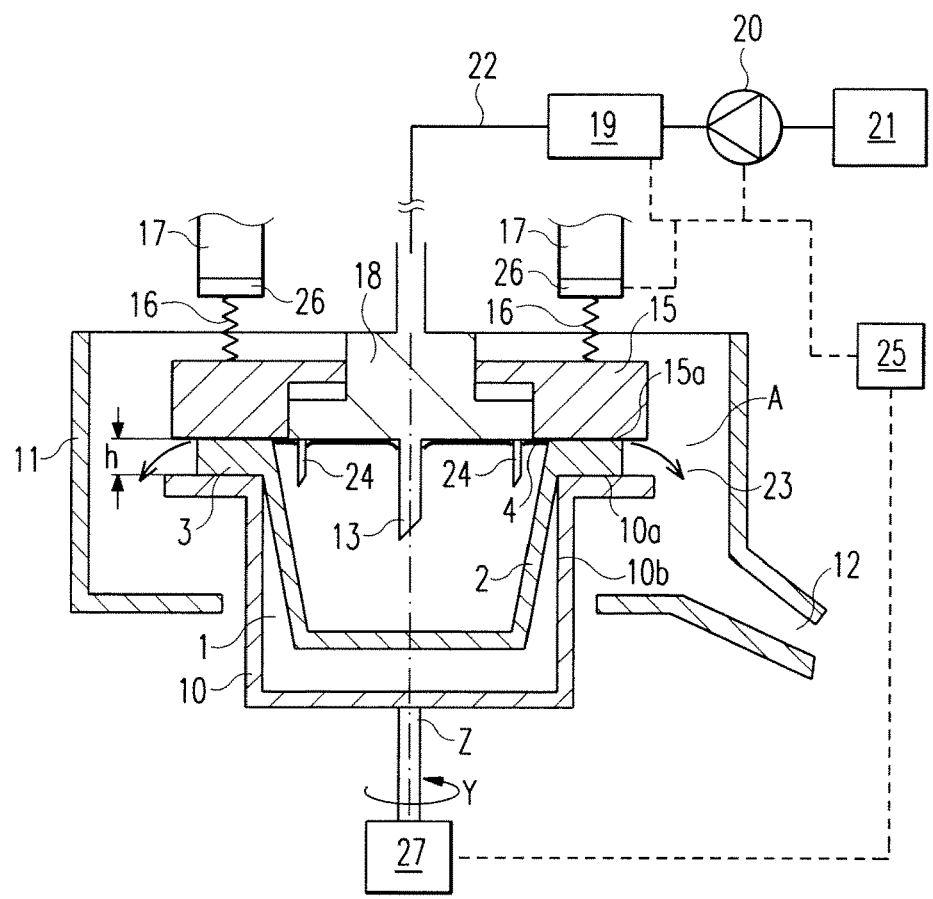
FIG. 3 is a schematic representation of the centrifugal device into which is inserted a capsule according to the invention, wherein the back-pressure is exerted by spring loading means.

The rim 3 of the capsules preferably extends outwardly in a direction essentially perpendicular (as illustrated) or slightly inclined (if bended as aforementioned) relative to the axis of rotation Z of the capsule 1 (see FIG. 3). Thereby, the axis of rotation Z represents the axis of rotation during centrifugation of the capsule in the brewing device.

It should be understood that the shown embodiment is just an exemplary embodiment and that the capsule 1 in particular the capsule body 2 according to the invention can take various different embodiments.

The capsules 1A, 1B, 1C are preferably single-use capsules. However, it should be noticed that the capsules can deliver more than one beverage at a time, for example, a volume of coffee extract sufficient for filling two cups at a same time.

The body 2 of the respective capsule has a single convex portion 5a, 5b, 5c of variable depth, respectively, d1, d2, d3. Thereby, the portion 5a, 5b, 5c may as well be a continuously truncated or a partially cylindrical portion.

Hence, the capsules 1A, 1B, 1C preferably comprise different volumes but a same insertion diameter 'D'. The capsule of FIG. 1a shows a small volume capsule 1A whereas the capsule of FIGS. 1B and 1C show a larger volume capsule 1B respectively 1C. The insertion diameter 'D' is hereby determined at the line of intersection between the lower surface of the rim 3 and the upper portion of the body 2. However, it could be another referencing diameter of the capsule in the device.

The body 2 of the capsules is preferably rigid or semi-rigid. It can be formed of a food grade plastic, e.g., polypropylene, with a gas barrier layer such as EVOH and the like or aluminium alloy or a laminate of plastic and aluminium alloy. The membrane 4 can be made of a thinner material such as a plastic film also including a barrier layer or aluminium alloy or a combination of plastic and aluminium alloy. The membrane 4 is usually of a thickness between 10 and 250 microns, for example. The membrane is perforated for creating the water inlet as will be described later in the description. The membrane also further comprises a perforable peripheral area.

Instead of the membrane 4, the capsules 1A, 1B, 1C may as well comprise a rigid or semi-rigid lid member which preferably has the form of a disk of plastic comprising a central portion having an inlet port for enabling the introduction of a water injection member and a peripheral portion having circumferentially arranged outlet openings.

The volume difference between the small and large capsules is obtained particularly by varying the depth (d1, d2, d3) of the body 2 of the capsules in the set. In particular, the depth of the body of the smaller capsule 1A is lower than the depth of the body of the larger capsules 1B, 1C.

Of course, an equivalent (non illustrated) mode to obtain different volumes would be to vary the bottom shape of the capsule or other dimensions of the capsule, e.g., its diameter.

The small volume capsule 1A preferably contains an amount of extraction ingredient, e.g., ground coffee, smaller than the amount for the large volume capsules 1B, 1C. Hence, the small capsule 1A is intended for delivery of a short coffee of between 10 mL and 60 mL with an amount of ground coffee comprised between 4 and 8 grams. The larger capsules 1B is intended for delivery of a medium-size coffee, e.g., between 60 and 120 mL and the largest capsule is intended for delivery of a long-size coffee, e.g., between 120 and 500 mL. Furthermore, the medium-size coffee capsule 1B can contain an amount of ground coffee comprised between 6 and 15 grams and the long-size coffee capsule 1C can contain an mount of ground coffee between 8 and 30 grams.

In addition, the capsules in the set according to the invention may contain different blends of roast and ground coffee or coffees of different origins and/or having different roasting and/or grinding characteristics.

As indicated in FIGS. 1a to 1c, the geometry of the rim 3 may be adapted to comprise, for example, a L-shaped cross section having an annular outer protrusion 8 formed in a direction perpendicular to a plane in which the membrane 4 is arranged. Thereby, the thickness h1, h2, h3 of the rim 3 is preferably adapted to the amount and/or characteristics of the beverage substance contained by the shown capsules 1A, 1B, 1C in order to enable an adjustment of the back-pressure exerted onto the capsule when being enclosed by a dedicated enclosing member 15 of a beverage production device.

In particular, for capsules containing a small amount of beverage substance—e.g. capsule 1A—in order to prepare e.g. a ristretto or espresso coffee beverage, a slow extraction might be desired for providing the coffee with a high intensity (i.e., a large amount of total coffee solids transferred in the coffee extract) and a thick crema. These characteristics can be compared to a faster extraction which might be desired for the beverage coming out of capsules 1B or 1C containing a larger amount of coffee powder. Therefore, for a given rotational speed during the beverage extraction, the back-pressure of a capsule 1A of a smaller volume containing a smaller amount of substance is to be adapted to be higher than the backpressure of larger capsule 1B or 1C containing a higher amount of substance. Accordingly, the indicated thickness h1 of the valve portion 8 of the rim for capsule 1A is chosen to be higher than the indicated thickness h2 respectively h3 for capsules 1B respectively 1C. Hence, the thickness h of the respective capsules 1A, 1B, 1C is adapted to increase as a function of the volume of capsules and/or the amount of beverage substance contained within the respective capsules.

For example, for smaller-size capsules as indicated by FIG. 1a, the thickness h1 is preferably chosen to be between 1.0 and 2.5 mm. For bigger-size capsules as indicated by FIGS. 1b and 1c, thickness h2 respectively h3 is preferably chosen to be between respectively 0.8 and 1.8 mm and between 0.5 and 1.5. Of course such values can differ greatly depending on the configuration of the valve means, in particular, on the device side.

However, as will be later explained with reference to FIG. 4 below, it is to be noted that the thickness may as well decrease as a function of the volume of beverage substance contained within the capsule, dependent on the force loading means exerting a predefined force on the rim 3 respectively the protrusion 8 of the capsule 1 when the capsule is enclosed in a beverage production device (cf. FIGS. 3 and 4).

Furthermore, it is to be noted that force generating means are provided in the device can be made non-adjustable in order to not change the applied force onto an enclosing member exerting a back-pressure onto the rim of the capsule once the capsule is engaged in the device. Accordingly, an adaptation of the applied back-pressure is preferably solely done by means of the variation of the geometry of the rim of the capsule.

As shown in FIGS. 1a to 1c, the width b of protrusion 8 delimits radially the valve portion of the rim. It is preferably of equal value for the different embodiments of the capsules 1A, 1B, 1C of the set.

It is to be understood that the thickness (h1, h2, h3) of the rim 3 respectively the annular protrusion 8 of a specific capsule may not only be adapted with regard to the volume, but also with regard to the nature of the beverage substance (e.g., amount, density, composition, etc.) contained within the capsule such that the back-pressure resulting when the rim 3 of the capsule is engaged with a portion of valve of the dedicated device, is adjusted to a desired value.

Figure 2A:
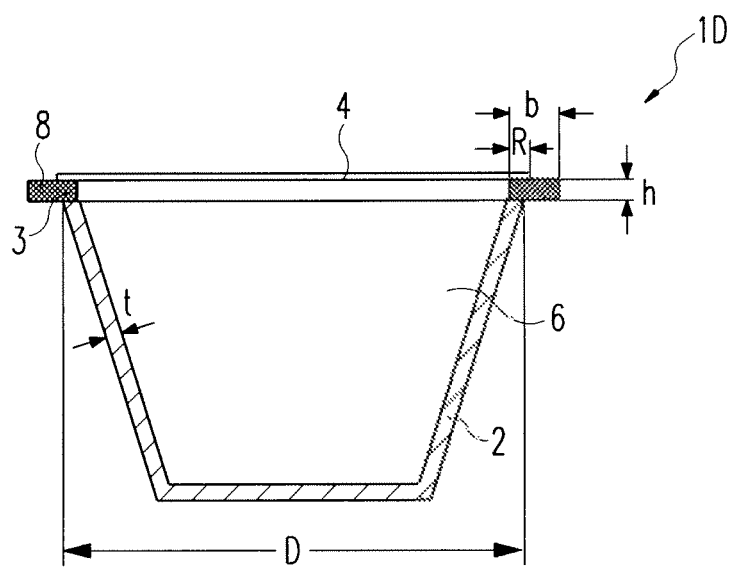
FIGS. 2a and 2b are cross sectional side views of further embodiments of a capsule of the system having a rim portion of different configuration.
Figure 2B:
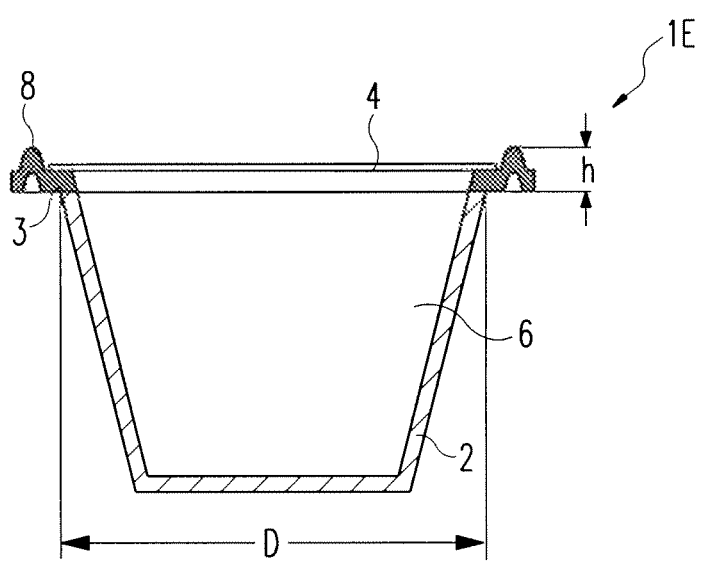

FIGS. 2a and 2b relate to further preferred embodiments of the capsules according to the present invention. Thereby, the shown embodiments of the capsules 1D and 1E preferably comprise the same diameter D as capsules 1A, 1B, 1C.

As shown in FIG. 2a, the capsule 1D is of frusto-conical form comprising a body 2 having a preferably constant wall thickness t. Thereby, the rim 3 of the capsule is formed integral with the body 2. As indicated in the figure, rim 3 of the capsule is preferably of essentially rectangular cross section of thickness h and width b. Thereby, thickness h and/or width b are preferably adapted to the type of capsule. Thickness h may be different of the preferably constant wall thickness t of the capsule.

In the shown embodiment, the membrane 4 is sealed to an annular portion R on the upper surface of rim 3 of the capsule. However, the membrane 4 may as well be sealed to the complete upper surface of rim 3 such that portion R equals width b.

FIG. 2b shows a further capsule 1E of a set of capsules according to the present invention. In this embodiment the geometry of the rim 3 is adapted to have a central essentially embossed protrusion 8 protruding above the sealing plane of the upper wall 4 on the rim.

In the context of the invention, the thickness "h" (or "h1", "h2", "h3", etc.) is measured from the lower surface of the rim 3 to the highest point of the rim, i.e., when an extension is provided from the highest point of the extension 8 of rim 3.

The thickness is anyway the effective distance which is adapted to adjust the back-pressure during the beverage extraction process by insertion of the capsule in the device as will be further explained.

As illustrated with regard to FIGS. 1a to 1c and 2a and 2b, the capsule rim portion 3 may take various geometrical designs in order to influence and adapt at least one brewing parameter during the beverage extraction process.

FIG. 3 shows a sectional side view of a device according to the system of the invention in a closed state thereof. Thereby, the device comprises a rotating capsule holder 10, a driving means 27, and a collector 11 onto which the centrifuged liquid impacts and drained through a beverage outlet 12. The driving means 27 can be a rotary motor which is linked to the capsule holder 10 at the bottom side (as illustrated) or top side (not illustrated).

Furthermore, the device comprises water injection means 18 having an injection member 13 being arranged to pierce the membrane 4 of the capsule 1 in a central portion thereof. The injection means 18 preferably also comprise a series of outlet perforators 24 as described in WO2008/148604. Accordingly, outlets are produced in an annular portion of the membrane 4 which enable an extracted beverage to leave the capsule 1 during the rotational movement thereof. The injection means 18 are connected to liquid circuit 22 comprising a liquid supply 21, a pump 20 and heating means 19 for providing a predefined volume of heated pressurized liquid to the capsule 1 during the beverage extraction process.

The device further comprises a valve portion 15 which is arranged circumferentially to the water injection unit 18 and which has a lower annular pressing surface 15a.

The valve portion 15 and the injection unit 18 are preferably movable with respect to the capsule holder 10 in order to enable an insertion and ejection of the capsule 1 to and from the capsule holder 10 before respectively after the beverage extraction process.

Moreover, the water injection means 18, the valve portion 15 and the capsule holder 10 are rotatable about axis Z.

The valve portion 15 is also made moveable independently from the injection unit 18 to take into account the different possible thicknesses of the capsules without affecting the relative position of the injection portion when engaged against the capsule. For this, portion 15 can be slidably mounted about injection unit 18.

In open configuration of the valve, a relatively small flow restriction is created that enables to force the flow of centrifuged liquid into a narrow jet of liquid projected onto the impact surface 11 of the device. The restriction forms an annular opening of surface area preferably comprised between 1.0 and 10.0 mm$^2$. The surface area of the flow restriction can vary depending on the set backpressure value in the valve by the capsule and the rotational speed of the capsule wherein in general the higher the speed, the larger the surface area.

The capsule holder 10 has an inner circumferential surface 10b that forms a referencing diameter substantially equal to diameter 'D' of the capsule 1 so as to ensure a tight fit of the capsule in the capsule holder 10 without possible radial play.

The capsule holder 10 is preferably hollow or deep enough at its centre to be able to accommodate all capsules of the set. Accordingly, a unique capsule holder is sufficient to receive all the capsules 1A, 1B, 1C, 1D, 1E of the set. The shown collector 11 terminates by a beverage outlet 12 such as formed as at least one open duct directed to one or more cups to collect the prepared beverage.

It should be noted that the capsule holder can take various shapes and may also be formed of a simple annular hollow ring.

The capsule 1 also lies solidly on its rim 3 onto an upper flange 10a of the capsule holder 10 without the body 2 substantially deforming radially. In this configuration, the water injection unit 18 and the valve portion 15 are engaged against the membrane 4 and rim, respectively. The system thereby forms a valve 23 by engagement of the valve portion 15 of the device and valve portion 8 of the capsule.

The valve 23 is designed to close under the force of a resilient closure load obtained by a load generating system 16, 17 comprising a preferably spring-biasing element 16. The spring-biasing element 16 applies a predefined resilient load onto the enclosing member 15. The load primarily distributes itself along the pressing surface 15a of the valve portion 15 acting in closure against the annular surface of the valve portion of rim 3. Such surface may also be a simple annular contact line. Therefore, the valve 23 normally closes off the flow path for the centrifuged liquid until a sufficient pressure is exerted on the upstream area of the valve by the centrifuged liquid exiting through the orifices created by the perforating elements 24. It should be noted that a small liquid leakage through the valve means 23 may be required that helps vent the gas or air contained in the capsule during the filling of the capsule with liquid (not shown). This leakage may be obtained by small radial grooves or orifices provided in any of the valve portions (portion 15 of the device and/or rim 3 of the capsule). The leakage may also be obtained by small embossings on the membrane 4 to create a leak. The small embossings could be on the surface of the valve portion 15. The liquid flows thus between the membrane 4 and the valve portion 15 and forces the valve 23 to open by pushing the whole enclosing member 15 upwards against the force of the spring-biasing element 16. The centrifuged liquid can thus transverse the restriction created between the surface 15a of the portion 15 and the upper surface or line of the rim 3 or protruding portion 18. The liquid is thus ejected at a high velocity against the collector 11 as indicated by arrow A in FIG. 3 or another vertically oriented annular wall of the device placed between the collector and the valve 23 (not shown).

Thereby, extraction of the beverage out of the capsule 1 is obtained by driving the injection unit 18, the valve portion 15 and the capsule holder 10 together with the capsule, in rotation (Y) about axis Z, at an extraction speed, e.g., between 500 and 16500 rpm. The rotation is driven by a rotational motor 28 connected to at least the capsule holder 10 or injection unit 18. Hence, during operation of the capsule 1 placed into the system according to the invention, the capsule 1 is rotated about its axis Z. Thereby, liquid which is centrally injected into the capsule 1 would tend to be guided along the inner surface of the side wall of the body 2, up to the inner side of the membrane 4, and then through the perforated outlet filtering openings created in the membrane 4 by the perforating members 24. Due to the centrifugation of the liquid in the capsule 1, the liquid and the ingredients or substance provided within the capsule are made to interact in order to form a liquid comestible (e.g., liquid extract).

It is to be understood that the force acting on the rim 3 of the capsule 1 by pressing surface 15a can be adjusted by the geometry of the rim 3 such as e.g. the thickness h of the rim 3. Hence, in particular the exerted back-pressure acting on the rim 3 can be adjusted by adapting the thickness h of the rim 3 to predefined values thereof. Thereby, a higher back-pressure can be obtained by a larger thickness h, since this leads to a higher compression of the spring biasing element 16 which then exerts a higher force onto the pressing surface 15a. Correspondingly, a lower value for thickness h leads to a lower compression of the spring biasing element 16 and thus, to a relative lower force acting on the pressing surface 15a, so a lower back-pressure. Hence, the thickness h is preferably designed to increase for obtaining a resulting higher back-pressure.

Accordingly, in a simple mode of the invention, due to a particular adjustment of the back-pressure, as described, the resulting flow rate is set e.g. dependent on the type of capsules (e.g., 1A, 1B or 1C) inserted in the device.

Thereby, the present invention constitutes a built-in solution according to which the spring load of the enclosing member 15 enclosing the capsule 1 in a device does not have to be externally manipulated for each beverage preparation procedure in which a beverage of different nature is to be prepared. Instead, the spring load is preferably held at a constant predefined value in order to enable an accurate adjustment of the back-pressure by means of the variation of the geometry of the rim 3 of the capsule. Hence, a more convenient and reliable adjustment of the back-pressure onto the capsule 1 during beverage brewing in a system according to the present invention is enabled.

In a more sophisticated mode of the invention, the capsule 1 may as well include identifying means to control brewing parameters and/or interact with the beverage production device.

Thereby, the identifying means preferably enable to provide information about the type of capsule engaged in the beverage production device. Accordingly, brewing parameters the volume and/or the rotational speed at which the beverage is prepared may be automatically adjusted by the device dependent on the provided information of the capsule. Customization options may also be provided to the user for enabling the modification by the user of certain extraction parameters within given ranges.

In a preferred embodiment, the portion of valve of rim 3 of the capsule 1 may be designed to form an identifying means that provides a discriminable information to the device as a function of its geometry, e.g., its particular thickness. Thereby, the device preferably comprises sensing means 26 designed to interact with the identifying means of the capsule.

As illustrated in FIG. 3, the sensing means 26 of the device can be a pressure sensor connected to the load generating means 16, 17 of the device. The sensing means 26 are preferably connected to a control means 25 of the device in order to provide information related to the present back-pressure acting onto the rim 3 of the engaged capsule, i.e., pressure or force value. Thereby, the control means 25 are preferably connected to at least the drive means 27, the pump 20 and the heating means 19. Thus, the brewing parameters such as the rotational speed of the motor 27, the temperature, the pressure and/or the volume of the liquid provided to the capsule during the beverage production process may be adjusted dependent on the provided information of the sensing means 26. In particular, the thickness h of the rim 3 is designed to vary the resulting back-pressure of valve 23 in order to adapt the brewing parameters of the particular beverage to be prepared. Furthermore, in function of the sensed information by the pressure sensors 26, the rotational speed is adjusted at the desired value that corresponds to a desired flow rate. As a result, different speeds or speed ranges can be selected as function of the sensed information by the sensing means 26. Selection of the speed is provided in the control unit 25 which controls in return the rotary motor 26 and if necessary the flow rate of the pump 20 to ensure sufficient supply of liquid in the capsule as a function of the selected speed.

In a different mode (not illustrated), the pressure sensing means can be replaced by one or more distance sensors. For example, the thickness h of the rim can be sensed directly or indirectly. For example, the length variation of the load generating means 16, 17 (e.g. spring length) can be sensed by distance sensor and provided as information to the control unit 25 for adjusting the brewing parameters, e.g., the rotation speed and/or volume of injected liquid.

Figure 5:
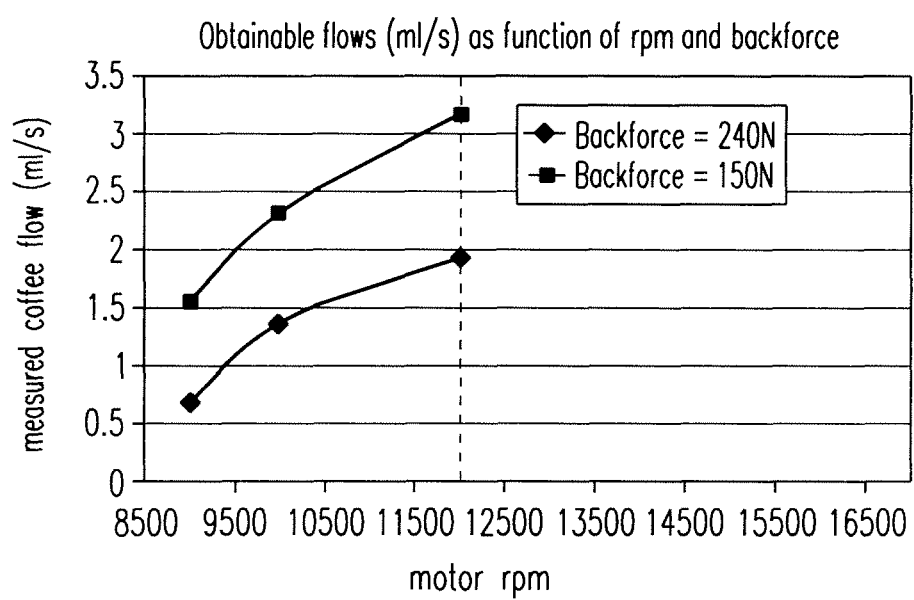
FIG. 5 is a graphical representation of the coffee flow rates obtainable with two different capsules providing different back-pressures as a function of the rotational speed of the capsule in the centrifugation device.

The flow control principle of the invention is illustrated in FIG. 5. The graphic illustrates the evolution of the beverage flow rate, e.g., coffee flow rate, (in mL/sec) as a function of the rotation speed of the motor (in rpm) for two different capsules (i.e. backforces). The backforce is here the force exerted by the annular pressing surface 15a, due to the compression of the spring loading member 16 of the device, onto the capsule's rim contact surface of portion 8 considering that the pressing surface in contact with the contact surface of portion 8 represents about 186 mm$^2$. The lower curve represents a capsule setting a backforce of 240 Newton (or a backpressure of 1.29 Mpa or 12.9 bar). The upper curve represents another capsule with a smaller thickness of its portion 8 setting consequently a lower backforce of only 150 Newton (or a backpressure of 0.819 Mpa or 8.19 bar). It is apparent that the flow rate can be set within a large range, e.g., 0.5 to 3.5 mL/sec for both capsules while maintaining a relatively narrow range of rotational speed, i.e., 9000 to 12000 rpm. If only a single capsule would be utilized providing a single backforce of 150 Newton, the same flow range would be covered only with a much larger range of speeds, i.e., between 9000 and more than 16500 rpm. Therefore, the invention provides larger opportunities of tailoring beverage characteristics with a much larger range of flow rate. In particular, one advantage can also be to reduce the useful speed range while maintaining the opportunity to deliver beverages within a larger range of flow rate.

Figure 4:
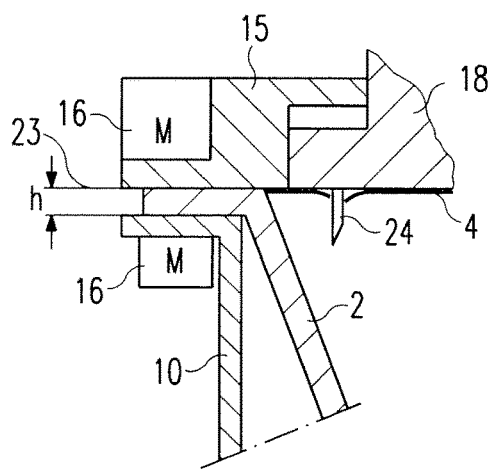
FIG. 4 is a sectional side view of the centrifugal device into which is inserted a capsule according to the invention, wherein the back-pressure is exerted by magnetic means.

FIG. 4 relates to another preferred embodiment of a device according to the present invention showing a sectional side view of the valve means 23 constituted by the rim portion 3 enclosed by the capsule holder 10 and the valve portion 15 of the device. Thereby however, the obtained back-pressure is obtained due to load generating means 16 which in this embodiment comprise two magnets M arranged in the valve portion 15 and the capsule holder 10 respectively. Thereby, the magnets M may be circumferentially arranged about axis Z of the device (see FIG. 3) in order to enable a uniform force distribution between the enclosing member 15 and the capsule holder 10 enclosing the rim 3 of the capsule.

By contrast to the shown embodiment according to FIG. 3, it is to be noted that the resulting back-pressure decreases for an increasing thickness h of the rim 3, since the attracting forces between the two opposed magnets M decrease if the distance between the magnets is increased. This has to be considered for the design of the height h of the rim. Hence, in such an embodiment, the height h is decreased in order to obtain a higher resulting back-pressure acting between the enclosing member 15 and the capsule holder 10 respectively the rim 3 of the capsule 1.

In other possible mode of the invention (non illustrated), the valve as obtained by the cooperation of the capsules and device can be replaced by a valve as part of the capsule only. In this case, the valve is geometrically designed for at least two types of capsules, preferably each type of capsules of the set, to provide different backpressures for the centrifuged liquid.

In another possible mode of the invention (non illustrated), the backpressure is obtained by a fixed restriction such as by at least one, but preferably a plurality of radially positioned outlet orifices provided through the capsule, whose total opening surface area varies in function of the type of capsule in the set. The restriction orifices provide a backpressure which is function of the number of outlet orifices and the individual opening section of each orifice. For instance, orifices can be provided along a circular path through the upper wall of the capsule or an annular path through the sidewall of the capsule. The total surface area of the flow restriction can represent between 0.5 and 5.0 mm$^2$, more preferably between 0.75 and 3.0 mm2, most preferably between 1.0 and 2.5 mm$^2$, for example, at about 1.7 mm$^2$. The number of outlet orifices for creating the flow restriction in the periphery of the capsule can range of from 1 to 300, more preferably between 3 and 150. For example, a first capsule comprises a flow restriction formed of 10 orifices of each 0.2 mm$^2$ and a second capsule with a flow restriction of 15 orifices of each 0.2 mm$^2$. In another mode, a first capsule comprises a flow restriction formed of 10 orifices of each 0.2 mm$^2$ and a second capsule with a restriction of 10 orifices of each 0.25 mm$^2$. The first capsules provide a function of flow rate to pressure which differs from the second capsules. In particular, due to a lower total surface area of their restriction, the first capsules provide a higher backpressure for the centrifuged liquid than the second capsules. The rotational speed can be controlled at specific values to ensure a flow rate for the first and second capsules that corresponds to the characteristics of the beverage to be produced. Of course other capsule types can be designed in the set of capsules to ensure other different backpressure characteristics.

Although the present invention has been described with reference to preferred embodiments thereof, many modifications and alternations may be made by a person having ordinary skill in the art without departing from the scope of this invention which is defined by the appended claims.

The invention claimed is:

1. A capsule system for preparing a beverage by centrifugation of a capsule in a centrifuging brewing device, the capsule system comprising:
   a centrifuging brewing device comprising a controller capable of operating the device by controlling a parameter selected from the group consisting of a beverage flow rate, a volume of the beverage, and a combination thereof; and
   a set of capsules comprising a first capsule and a second capsule, each of the first and second capsules configured to be inserted in the centrifuging brewing device and form, in cooperation with the centrifuging brewing device, a flow restriction or flow restriction valve which provides a backpressure exerted on a centrifuged liquid during rotation of the inserted capsule, the first capsule comprising a first body and a first rim extending from the first body perpendicular to an axis of rotation of the first capsule, the second capsule comprising a second body and a second rim extending from the second body perpendicular to an axis of rotation of the second capsule, the first rim has a different thickness than the second rim,
   the controller selectively adjusts, as a function of the exerted backpressure by the flow restriction or flow restriction valve, either
      a rotational centrifugation speed of the inserted capsule, or
      the rotational centrifugation speed of the inserted capsule and a volume of injected liquid in the capsule.

2. The capsule system according to claim 1, wherein the first rim and the second rim are each designed to interact with an enclosing member of the brewing device to form the flow restriction valve which exerts the back-pressure onto the corresponding rim of the inserted capsule.

3. The capsule system according to claim 1, wherein the adjustment of the rotational centrifugation speed is a selection from at least two different values or ranges of rotational speed of the inserted capsule enabling release of centrifuged liquid from the inserted capsule through the flow restriction or flow restriction valve.

4. The capsule system according to claim 1, wherein the rotational speed is adjusted during release of the centrifuged liquid to match a reference flow rate of the injected liquid in the inserted capsule or a reference pressure of the injected liquid.

5. The capsule system according to claim 4, wherein the controller is configured such that predefined values or ranges of the rotational speed of the inserted capsule can be altered by a user operation.

6. The capsule system according to claim 1 wherein the controller is configured such that predefined values or ranges of the rotational speed of the inserted capsule are automatically adjusted using a physical feature of the inserted capsule.

7. The capsule system according to claim 2, wherein the geometry of the first rim and the geometry of the second rim are each designed to vary the exerted back-pressure by the flow restriction valve.

8. The capsule system according to claim 2, wherein the different thickness of the first and second rims respectively calibrates at least two different backpressures of the flow restriction valve when in engagement in the centrifuging brewing device.

9. The capsule system according to claim 8, wherein the thickness of the rim is increased or decreased from the first rim to the second rim as a function of one or more of a storage volume of the corresponding capsule, a weight of the beverage substance enclosed by the corresponding capsule, or a type of beverage to be prepared from the corresponding capsule.

10. The capsule system according to claim 8, wherein the thickness of the first and second rims varies between 0.2 and 3 mm depending on a type of capsule.

11. The capsule system according to claim 2, wherein each of the first and second rims is formed integral with the first and second bodies respectively.

* * * * *